US007126019B2

(12) United States Patent
Bloom et al.

(10) Patent No.: US 7,126,019 B2
(45) Date of Patent: Oct. 24, 2006

(54) METHOD FOR THE PRODUCTION OF FATTY ACIDS HAVING A LOW TRANS-FATTY ACID CONTENT

(75) Inventors: Paul D. Bloom, Decatur, IL (US); Inmok Lee, Decatur, IL (US); Peter Reimers, Monticello, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 84 days.

(21) Appl. No.: 10/865,078

(22) Filed: Jun. 10, 2004

(65) Prior Publication Data

US 2004/0267035 A1 Dec. 30, 2004

(51) Int. Cl.
*C07B 51/43* (2006.01)

(52) U.S. Cl. ...................................... 554/207; 554/206

(58) Field of Classification Search ................ 554/206, 554/207

See application file for complete search history.

(56) References Cited

U.S. PATENT DOCUMENTS 5,288,619 A 2/1994 Brown et al.

FOREIGN PATENT DOCUMENTS

GB 594141 11/1947
WO WO 97/16978 5/1997
WO WO 97/43907 11/1997
WO WO 01/14304 A1 3/2001

OTHER PUBLICATIONS

King et al., Green Chemistry,vol. 1, No. 6, pp. 261-264,1999.*

Aro et al., "Steric acid, *trans* fatty acids, and dairy fat: effects on serum and lipoprotein lipids, apolipoproteins, lipoprotein(a), and lipid transfer proteins in healthy subjects," *American Journal of Clinical Nutrition*, 65:1419-1426 (1997).

Judd et al., "Dietary *trans* fatty acids: effects on plasma lipids and lipoproteins of healthy men and women," *American Journal of Clinical Nutrition*, 59:861-868 (1991).

Judd et al., "Effects of margarine compared with those of butter on blood lipid profiles related to cardiovascular disease risk factors in normolipemic adults fed controlled diets," *American Journal of Clinical Nutrition*, 68:768-777 (1998).

Louheranta et al., "A High-*Trans* Fatty Acid Diet and Insulin Sensitivity in Young Healthy Women," *Metabolism*, 48:870-875 (1999).

(Continued)

*Primary Examiner*—Deborah D. Carr
(74) *Attorney, Agent, or Firm*—Kirkpatrick & Lockhart Nicholson Graham LLP

(57) ABSTRACT

This invention relates to a method of hydrolyzing glycerol fatty acid ester-containing composition, such as a fat and/or an oil, to produce fatty acids having a low proportion of trans-isomer fatty acids. Specifically, the present invention relates to a process for the hydrolyzing the glycerol fatty acid ester-containing compositions under conditions resulting in a low proportion of trans-isomer fatty acids.

80 Claims, 1 Drawing Sheet

OTHER PUBLICATIONS

Mensink and Katan, "Effect of Dietary *Trans* Fatty Acids on High-Density and Low-Density Lipoprotein Cholesterol Levels in Healthy Subjects," *The New England Journal of Medicine*, 323:439-445 (1990).

Müller et al., "Effect on plasma lipids and lipoproteins of replacing partially hydrogenated fish oil with vegetable fat in margarine," *British Journal of Nutrition*, 80:243-251 (1998).

Sundram et al., "*Trans* (Elaidic) Fatty Acids Adversely Affect the Lipoprotein Profile Relative to Specific Saturated Fatty Acids in Humans," *Journal of Nutrition*, 127:514S-520S (1997).

Ascherio et al., "*Trans* Fatty Acids and Coronary Heart Disease," *The New England Journal of Medicine*, 340:1994-1998 (1999).

Brady et al., "Lipase Immobilized on a Hydrophobic, Microporous Support for the Hydrolysis of Fats," *Journal of the American Oil Chemist's Society*, 65:917-921 (1988).

N.O.V. Sonntag, "Fat Splitting," *Journal of the American Oil Chemist's Society*, 56:729A-732A (1979).

Lin et al., "Reaction Kinetics, Reactor Design, and Thermodynamics" in *Perry's Chemical Engineers' Handbook, 6th ed.*, R.H. Perry, D.W. Green and J.O. Maloney eds., McGraw-Hill, 1984, Section 4, pp. 4-24 to 4-27.

International Search Report with Written Opinion of the International Searching Authority for International Application No. PCT/US2004/018586 (filed Jun. 10, 2004), European Patent Office, Nov. 23, 2005.

* cited by examiner

METHOD FOR THE PRODUCTION OF FATTY ACIDS HAVING A LOW TRANS-FATTY ACID CONTENT

BACKGROUND

1. Field of the Invention

A method of hydrolyzing fats and oils to produce fatty acids having a low proportion of trans-isomer fatty acids. Specifically, the present invention relates to a process for hydrolyzing fats and oils under conditions resulting in a low proportion of trans-isomer fatty acids.

2. Description of the Related Art

The term "fatty acids" is commonly understood to refer to the carboxylic acids naturally found in animal fats, vegetable, and marine oils. They consist of long, straight hydrocarbon chains, often having 12–22 carbon atoms, with a carboxylic acid group at one end. Most natural fatty acids have even numbers of carbon atoms. Fatty acids may or may not contain carbon-carbon double bonds. Those without double bonds are known as saturated fatty acids, while those with at least one double bond are known as unsaturated fatty acids. The most common saturated fatty acids are palmitic acid (16 carbons) and stearic acid (18 carbons). Oleic and linoleic acid (both 18 carbons) are the most common unsaturated fatty acids.

Trans fatty acids are unsaturated fatty acids that contain at least one double bond in the trans isomeric configuration. The trans double bond configuration results in a greater bond angle than the cis configuration. This results in a more extended fatty acid carbon chain more similar to that of saturated fatty acids rather than that of cis unsaturated double bond containing fatty acids. The conformation of the double bond(s) impacts on the physical properties of the fatty acid. Those fatty acids containing a trans double bond have the potential for closer packing or aligning of acyl chains, resulting in decreased mobility; hence fluidity is reduced when compared to fatty acids containing a cis double bond. Trans fatty acids are commonly produced by the partial hydrogenation of vegetable oils It has long been known that high dietary levels of saturated fatty acids are linked to increased total and low-density lipoprotein (LDL) cholesterol concentrations. More recently, however, a number of studies have reported that a diet rich in trans-isomer fatty acids not only increased LDL concentrations but also decreased high-density lipoprotein (HDL) cholesterol concentration, resulting in a less favorable overall total cholesterol/HDL cholesterol ratio (Aro et al, *Am. J. Clin. Nutr.,* 65:1419–1426 (1997); Judd et al, *Am. J. Clin. Nutr.,* 59:861–868 (1994); Judd et al, *Am. J. Clin. Nutr.,* 68:768–777 (1998); Louheranta et al, *Metabolism* 48:870–875 (1999); Mensik and Katan, *N. Engl. J. Med.* 323:439–445 (1990); Muller et al, *Br. J. Nutr.* 80:243–251 (1998); Sundram et al, *J. Nutr.* 127:514S–520S (1997)). Recent data has further demonstrated a dose-dependent relationship between trans-isomer fatty acid intake and the LDL:HDL ratio and the magnitude of this effect is actually greater for trans-isomer fatty acids compared to saturated fatty acids (Ascherio et al, *N. Engl. J Med.* 340:1994–1998 (1999)).

Naturally occurring fats and oils contain triesters of glycerol and three fatty acids. Hence, they are referred to chemically as triacylglycerols or, more commonly, triglycerides. The fat or oil from a given natural source is a complex mixture of many different triacylglycerols. Vegetable oils consist almost entirely of unsaturated fatty acids, while animal fats contain a much larger percentage of saturated fatty acids. Fats and oils are used in a wide variety of products, such as soaps and surfactants, lubricants, and in a variety of other food, agricultural, industrial, and other personal care products.

Triacylglycerols, like all esters, can by hydrolyzed to yield their carboxylic acids and alcohols. The reaction products produced by the hydrolysis of a fat or oil molecule are one molecule of glycerol and three molecules of fatty acids. This reaction proceeds via stepwise hydrolysis of the acyl groups on the glyceride, so that at any given time, the reaction mixture contains not only triglyceride, water, glycerol, and fatty acid, but also diglycerides and monoglycerides.

Currently, the most commonly used commercial process for hydrolyzing fats and oils is a high-temperature steam treatment method known as the Colgate-Emery Steam Hydrolysis Process (Brady, C., L. Metcalfek, D. Slaboszewski, and D. Frank, JAOCS, 65:917–921 (1988)). This method, and modifications thereof, use a countercurrent reaction of water and fat under high temperatures ranging from 240° C. to 315° C. and high pressures in the range of 700 to 750 PSIG. Presently, the Colgate-Emery process is the most efficient and inexpensive method for large-scale production of saturated fatty acids from fats and oils. In this method, a tower is used to mix the fat and water to increase the efficiency of the hydrolysis reaction. The fat is introduced from the bottom of a tower with a high pressure feed pump. Water is introduced from near the top of the tower at a ratio of 40–50% of the weight of the fat. As the fat rises though the descending water, a continuous oil-water interface is created. It is at this interface that the hydrolysis reaction occurs. Direct injection of high pressure steam raises the temperature to approximately 260° C. and the pressure is maintained at 700–715 PSIG. The increased pressure causes the boiling point of the water to increase, allowing for the use of higher temperatures, which results in the increase of the solubility of the water in the fat. The increased solubility of water provides for a more efficient hydrolysis reaction. This continuous, countercurrent, high pressure process allows for a split yield of 98–99% efficiency in 2–3 hours (Sonntag, JAOCS 56: 729A–732A (1979)). Further purification of the fatty acid product obtained by this method is often accomplished by means such as distillation.

However, due to the extreme reaction conditions, this process often leads to extensive degradation of the produced fatty acids. For example, the Colgate-Emery method has not been shown to be effective in splitting heat sensitive triglycerides containing conjugated double bonds, hydroxy-containing fats and oils like castor oil, fish oils containing polyunsaturated acids and soybean oils high in unsaturated fats due the formation of by-products such as trans-isomer fatty acids and the degradation of the unsaturated fatty acids at high temperatures (Sonntag, JAOCS 56: 729A–732A (1979)). Therefore, the production of fatty acids from vegetable oils (e.g., soya, corn and peanut), which are generally high in unsaturated fats, is not recommended by this method.

Some sectors of industry have used other methods of hydrolysis to avoid the by-product formation and unsaturated fat degradation associated with the high pressure-high temperature hydrolysis of unsaturated fats and oils. These include the hydrolysis of unsaturated oils by splitting them with a base followed by acidulation or by enzymatic hydrolysis. However, none of these methods have shown split yields comparable to the Colgate-Emery process under similar time conditions.

In light of the limitations of the current methods used for the hydrolysis of unsaturated fats and oils, a need in the art exists for an efficient method of non-catalytic hydrolysis suitable for unsaturated fats and oils which produces fatty acid products with a low percentage of trans-isomer fatty acids.

Moreover, the U.S. Food and Drug Administration has initiated the process of requiring food labels to include the trans-isomer fatty acid contents of food. As such, there is an incentive for food manufacturers to decrease the trans-isomer fatty acid content of their products. Thus, a need has developed for methods of hydrolysis of unsaturated fats and oils that provide for the production of fatty acids with a low proportion of trans-isomer fatty acids for use as food products.

The present invention addresses these needs by providing a method of hydrolyzing fats and oils high in unsaturated fat whereby the fatty acid products have a low trans-isomer fatty acid content suitable for use in the food industry.

BRIEF SUMMARY OF THE INVENTION

Methods are provided for production of fatty acids by the hydrolysis of a glycerol fatty acid ester-containing composition, such as a fat and/or an oil, under reaction conditions that result in the production of fatty acid products having a low proportion of trans-isomer fatty acids.

The low trans-isomer fatty acid product typically is further processed to first separate the oil phase from the aqueous phase and removing fatty acids from the oil phase, for example, by distillation. The low trans-isomer fatty acid product can then be used as a substrate for the production of 1,3-diacylglycerides.

The removal of the fatty acids from the oil phase leaves a glycerol fatty acid ester-containing residue phase that can be recycled for use as a starting material for subsequent hydrolysis reactions, typically be mixing the residue phase with additional glycerol fatty acid ester-containing composition.

Also provided are low trans-isomer fatty acids produced by the hydrolysis of fats and/or oils high in unsaturated fats.

In one embodiment, the low trans-isomer fatty acids are used in the production of food products such as cooking oils.

DETAILED DESCRIPTION

Figure 1:
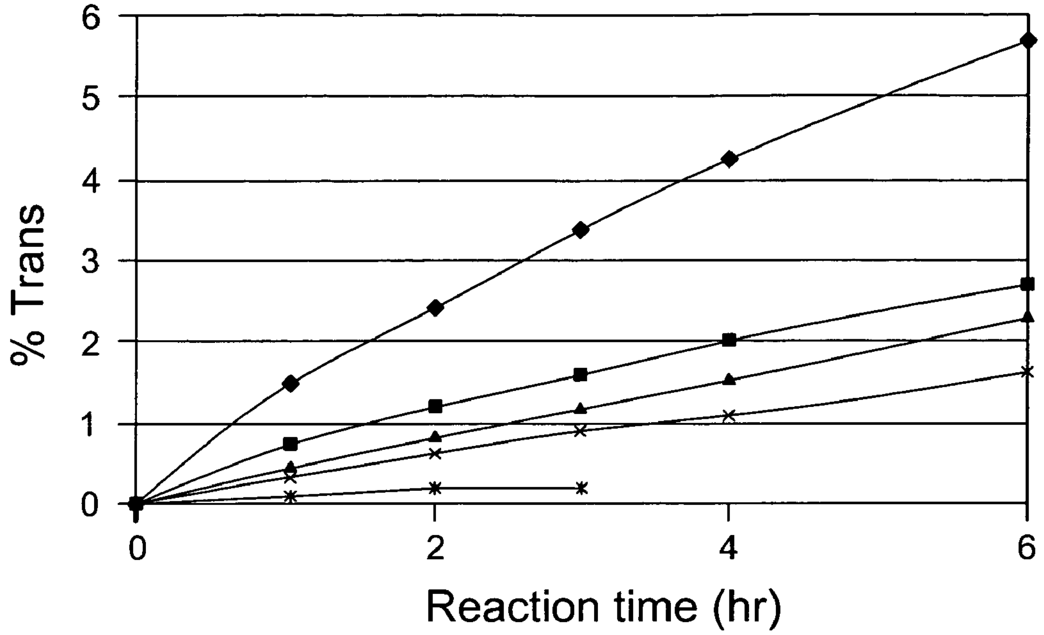
FIG. 1 is a graph showing the increase in formation of trans-isomer fatty acids at various temperatures and various times. 280 g RBD (refined/bleached/deodorized) of soy oil (0.8% trans-isomer content) was reacted with 420 g of water at 220° C. (stars), 225° C. (stars), 230° C. (triangles), 235° C. (squares), and 250° C. (diamonds) for 0–6 hours. The trans-isomer formation was determined by gas chromatography. This data shows that trans-isomer formation is dependent on reaction temperature and time.

A novel method is provided for the production of fatty acids having low trans-isomer fatty acid content through the hydrolysis of glycerol fatty acid ester-containing compositions, such as fats and/or oils.

As used herein, the term "hydrolysis" refers to the separation of a glycerol fatty acid ester-containing composition, such as a fat or oil starting material, into its fatty acid and glycerin components by reacting the starting material with water. In a preferred embodiment, this reaction is non-catalytic.

The hydrolysis reaction may be conducted in a batch, continuous or semi-continuous method depending on the needs of the user.

Batch hydrolysis methods refer to the method of taking all the reactants at the beginning of the hydrolysis reaction and processing them according to a predetermined course of reaction during which no material is fed into or removed from the batch reactor (*Perry's Chemical Engineers' Handbook*, p. 4–25, Sixth Edition (1984)).

Continuous hydrolysis methods refer to methods in which reactants are introduced to the reaction and products are simultaneously withdrawn from the reaction in a continuous manner. This method is commonly used in large-scale production facilities (*Perry's Chemical Engineers' Handbook*, p. 4–25, Sixth Edition (1984)).

Semi-continuous hydrolysis methods refer to methods that are neither batch nor continuous in nature. In one embodiment, some of the reactants are changed at the beginning, and the remaining reactants are introduced and the reaction progresses. In other embodiments, the reactions products are removed continuously from the reactor (*Perry's Chemical Engineers' Handbook*, p. 4–25, Sixth Edition (1984)).

The hydrolysis reaction may incorporate an agitation or countercurrent flow method to increase the efficiency of the reaction. This can be done either by mechanical means or by the countercurrent method described in the Colgate-Emery method.

The amount of water used in the hydrolysis reaction is based upon the weight of the starting material. One embodiment of the invention uses a minimum of three moles of water for every one mole of starting material. In a preferred embodiment, the ratio of water to starting material is 1.5 g water to 1 g starting material.

The hydrolysis reaction can be performed over a temperature range of about 200° C. to about 300° C. A preferred temperature range for hydrolysis is from about 220° C. to about 250° C. A more preferred temperature range for hydrolysis is from about 225° C. to about 235° C. An even more preferred temperature for hydrolysis is about 230° C.

The hydrolysis reaction can be performed in a batch method over a time range of about 0 hours to about 6 hours. A preferred time range for batch hydrolysis is from about 2 hours to about 4 hours. A more preferred time for batch hydrolysis is about 3 hours. However, the semi-continuous and continuous methods allow for perpetual processing due to the continuous introduction of starting materials and water to the reaction.

The terms "split yield" and "split ratio" are used interchangeably and refer to the percentage of free fatty acids produced by the hydrolysis reaction. As used herein, the terms refer to the fatty acid content of the oil phase.

The phrases "high split yield" or "efficient hydrolysis" are interchangeable and defined as split yields greater that 80%. More preferably, the split yield produced by the process of the invention is greater than 90%, more preferably greater than 91%, more preferably greater than 92%, more preferably greater than 93%, more preferably greater than 94%, more preferably greater than 95%, more preferably greater than 96%, more preferably greater than 97%, more preferably greater than 98%, more preferably greater than 99%.

Fatty acids with a low trans-isomer fatty acid content can also be obtained with low split yields. For example, fatty acids with a low trans-isomer fatty acid content are produced by a hydrolysis reaction with a split yield less than 80%, with a split yield less than 70%, with a split yield less than 60%, with a split yield less than 40%, or with a split yield less than 20%.

The starting materials that may be used in this invention vary widely. For purposes herein, starting materials include one or more refined or unrefined, bleached or unbleached and/or deodorized or non-deodorized fats or oils. The fats or oils can comprise a single fat or oil or combinations of more than one fat or oil. Likewise, the fats or oils either can be saturated, mono-unsaturated or poly-unsaturated or any combination thereof. The term "saturated" refers to the presence of carbon-carbon double bonds within the hydrocarbon chain. In a preferred embodiment, the starting material is mono-unsaturated or poly-unsaturated vegetable oil. In a particularly preferred embodiment, the starting material is a poly-unsaturated vegetable oil.

The one or more unrefined and/or unbleached fats or oils can comprise butterfat, cocoa butter, cocoa butter substitutes, illipe fat, kokum butter, milk fat, mowrah fat, phulwara butter, sal fat, shea fat, bomeo tallow, lard, lanolin, beef tallow, mutton tallow, tallow or other animal fat, canola oil, castor oil, coconut oil, coriander oil, corn oil, cottonseed oil, hazlenut oil, hempseed oil, linseed oil, mango kernel oil, meadowfoam oil, neat's foot oil, olive oil, palm oil, palm kernel oil, palm olein, palm stearin, palm kernel olein, palm kernel stearin, peanut oil, rapeseed oil, rice bran oil, safflower oil, sasanqua oil, soybean oil, sunflower seed oil, tall oil, tsubaki oil, vegetable oils, marine oils which can be converted into plastic or solid fats such as menhaden, candlefish oil, cod-liver oil, orange roughy oil, pile herd, sardine oil, whale and herring oils, or combinations thereof.

The phrase "high in unsaturated fats" includes fats and oils, or mixtures thereof, with an iodine value of greater than 110 as determined by the Wijs method. The term "iodine value" is defined as a measure of the total number of unsaturated double bonds present in a fat or oil. In a preferred embodiment, the fat or oil subjected to hydrolysis according to the present invention has an iodine value of above 120, more preferably above 130, more preferably above 135, and more preferably above 140.

The term "fatty acid" as used herein is applied broadly to carboxylic acids which are found in animal fats, vegetable and marine oils. They can be found naturally in saturated, mono-unsaturated or poly-unsaturated forms. The natural geometric configuration of fatty acids is cis-isomer configuration. The cis-isomer configuration contributes significantly to the liquidity of these acids.

The term "trans-isomer fatty acids" is defined as unsaturated fatty acids that contain at least one double bond in the trans isomeric configuration. As used herein, the phrases "low proportion of trans-isomer fatty acid" or "low trans-isomer fatty acid content" mean that the proportion of trans-isomer fatty acids found in the fatty acid product of the hydrolysis reaction of the present invention is less than 6% of the total fatty acid composition of the fatty acid product. In a preferred embodiment, the trans-isomer fatty acid content of the fatty acids produced by the hydrolysis of the invention is less than 5% of the total fatty acid product, more preferably less than 4%, more preferably less than 3%, more preferably less than 2%, more preferably less than 1.5%.

The term "fatty acid product" as used herein refers to the product of the hydrolysis reaction that comprises the free fatty acid component of the starting material. In a preferred embodiment, the process of the invention will yield a fatty acid product with less than a 3% increase in trans-isomer fatty acid content as compared to the trans-isomer fatty acid content of the starting material, more preferably less than 2.5% increase, more preferably less than 2% increase, more preferably less than 1.5% increase, more preferably less than 1% increase.

In another embodiment, the process of the invention further includes separating the free fatty acids (contained in the oil phase) from the reaction mixture (aqueous phase). As used herein, the term "oil phase" refers to the non-aqueous phase of the product of the hydrolysis reaction. Initially, the oil phase must be separated from the aqueous phase. Common methods of separation include centrifugation, distillation or settling. Upon separating the oil and aqueous phases, the free fatty acids are further separated from the other components of the oil phase. This is accomplished by distilling the oil phase, which results in the production of a distillate (containing free fatty acids) phase and a residue phase. In certain embodiments, distilling the oil phase may be performed under a vacuum. In certain embodiments, the distillation may be conducted in a batch reactor, a continuous reactor or a semi-continuous reactor.

In another embodiment, the residue phase of the distillation process, comprised mainly of mono-acylglycerides, di-acylglycerides and tri-acylglycerides, may be further processed to extract additional fatty acids. This further processing includes recycling the residue product back through the hydrolysis process. In certain embodiments, the residue phase may be mixed with additional glycerol fatty acid ester-containing composition prior to hydrolyzing the residue phase. In certain embodiments, the processing may be conducted in a batch reactor, a continuous reactor or a semi-continuous reactor.

In another embodiment, the fatty acid products of this invention can be further processed to produce low saturated, low trans-isomer fatty acid. This further processing includes coupling the hydrolysis method described herein with a method for removing saturated fatty acids via low temperature crystallization. More particularly, the process includes the mixing of the fatty acid product with a polyglycerol ester crystal modifier and subjecting the mixture to winterization in order to separate saturated fatty acids from unsaturated fatty acids. As used herein, the term "winterization" refers to the process of cooling oil to low temperatures until the high melting point molecules form solid particles large enough to be filtered out. Winterization is a specialized form of the overall process of fractional crystallization. In certain embodiments, the winterizing may be conducted in a batch reactor, a continuous reactor or a semi-continuous reactor.

In a particularly preferred embodiment, the fatty acids produced by the methods of the present invention are used to make 1,3-diacylglycerol. Specifically, the fatty acids products of the hydrolysis reaction of the present invention are treated with an enzyme, such as a lipase, which catalyzes esterification or transesterification of the terminal esters in the 1 and 3 positions of a glyceride. The products of esterification or transesterification may be further used in the production of food products. According to certain embodiments, the esterification may be conducted in a batch reactor, a continuous reactor or a semi-continuous reactor.

In an alternative embodiment, the fatty acids produced by the methods of the present invention are further processed by hydrogenation. As used herein, hydrogenation refers to the addition of hydrogen to double bonds of unsaturated fatty acids. This reaction is carried out by reacting the fatty acid product with gaseous hydrogen at elevated temperature and pressure.

In a further embodiment, the present invention is directed to a fatty acid composition having a low proportion of trans-isomer fatty acids prepared by the methods of the invention.

In another embodiment, the present invention is directed to a cooking oil containing the low trans-isomer fatty acid compositions of the present invention.

In yet another embodiment, the present invention is directed to foods containing the low trans-isomer fatty acid compositions of the present invention.

EXAMPLES

The examples described below show that starting material high in unsaturated fats can be hydrolyzed non-catalytically to produce a fatty acid product with low trans-isomer fatty acid content. The following examples are illustrative only and are not intended to limit the scope of the invention as defined by the appended claims.

Example 1

280 g of RBD (refined/bleached/deodorized) soy oil (0.8 trans-isomer content) and 420 g of water were reacted in a 1-L high pressure reactor with agitation of 1050 rpm for the given temperature and given times. The trans-isomer fatty acid content was determined by gas chromatography analysis.

FIG. 1 summarizes the results. After 6 hours at 250° C., the trans-isomer fatty acid content was 6% (diamonds). After 6 hours at 235° C., the trans-isomer fatty acid content was 2.3% (squares). After 6 hours at 230° C., the trans-isomer fatty acid content was 2.1% (triangles). After 6 hours at 225° C., the trans-isomer fatty acid content was 1.8% (stars). The results from this example demonstrate that by controlling the temperature and the time of the hydrolysis reaction, a fatty acid product can be obtained with low trans-isomer fatty acid content.

Example 2

280 g of RBD (refined/bleached/deodorized) soy oil (0.8% trans-isomer content) and 420 g of water were reacted in a 1-L high pressure reactor with agitation of 1050 rpm for the given temperature and given times. The split yield was determined by titration of fatty acids with potassium hydroxide.

Figure 2:
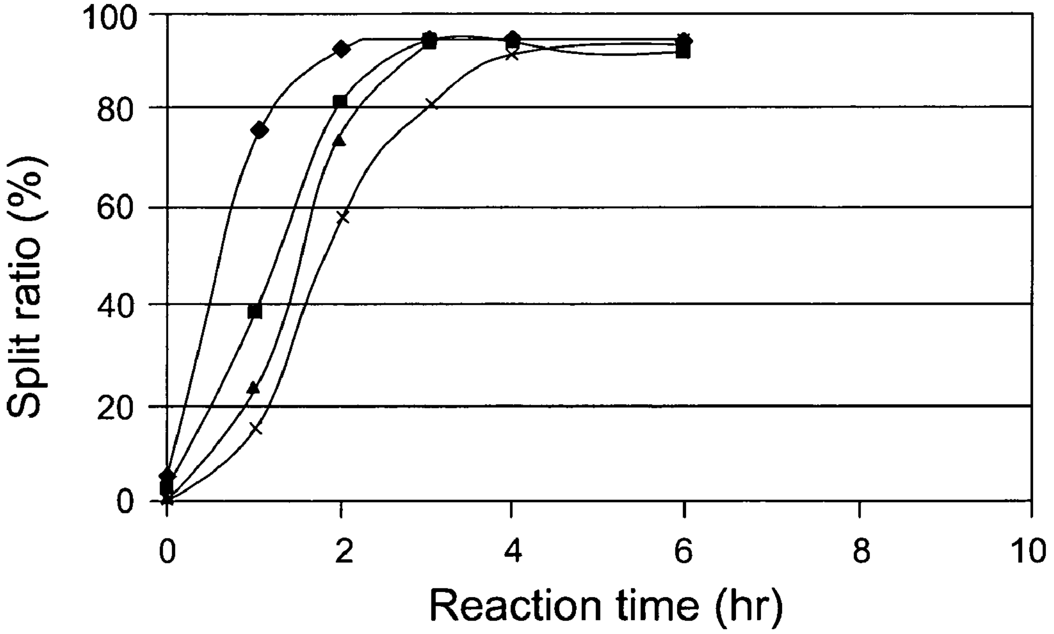
FIG. 2 is a graph showing the split ratio (% fatty acid formed) at various temperatures and various times. 280 g of RBD (refined/bleached/deodorized) soy oil (0.8% trans-isomer content) was reacted with 420 g of water at 225° C. (stars), 230° C. (triangles), 235° C. (squares), and 250° C. (diamonds) for 0–6 hours. The degree of hydrolysis (split ratio) was determined by titration of fatty acids with potassium hydroxide (KOH). This data shows that an efficient hydrolysis reaction can be achieved at temperatures below 300° C. in a reasonable reaction time.

FIG. 2 summarizes the results. After 3 hours at 250° C., the split yield was 95% (diamonds). After 3 hours at 235° C., the split yield was 95% (squares). After 3 hours at 230° C., the split yield was 93% (triangles). After 3 hours at 225° C., the split yield was 90% (stars). The results demonstrate that efficient hydrolysis can occur at temperatures below 300° C.

Example 3

The following example demonstrates the ability to further process the fatty acid product of the presently claimed hydrolysis reaction by recycling the residue portion of the fatty acid product after it has been purified by evaporation. 280 g of RBD (refined/bleached/deodorized) soy oil (0.8% trans-isomer content) was reacted with 420 g of water in a 1-L high pressure reactor. After a 3 hour reaction at 230 C, the split ratio and trans-isomer level were determined to be 92% and 2.1%, respectively. The upper phase of the hydrolysis reaction (fatty acid portion) was separated and purified by distillation. The distillate and residue were 87 parts and 13 parts, respectively. The distillate was 99% pure fatty acid. The residue was recycled back to the fat-splitting step for 5 cycles. During the 5 recycling steps, the average split ratio was 92%. There was no significant change in fatty acid composition, including trans-isomer formation, during the 5 recycles.

Example 4

RBD (refined/bleached/deodorized) soy oil (0.8% trans-isomer content) and water were reacted in a 1-Gal high pressure reactor at 230° C. and samples were drawn every 15 minutes as oil and water were fed into the reactor continuously for 30 hours. The upper phase of the withdrawn sample was separated and subjected to distillation for recovery of the fatty acid product. The residue portion was recycled back into the reactor as a part of the oil feed. The split ratio and trans-isomer fatty acid content in the final fatty acid products were determined, the average split ratio was about 80% and the trans-isomer content was 1.8%.

All publications mentioned above are herein incorporated by reference in their entirety.

While the foregoing invention has been described in some detail for purposes of clarity and understanding, it will be appreciated by one skilled in the art form a reading of this disclosure that various changes in form and detail can be made without departing from the true scope of the invention and appended claims.

We claim:

1. A method for producing fatty acids comprising hydrolyzing a glycerol fatty acid ester-containing composition under reaction conditions resulting in a fatty acid product having a trans-isomer fatty acid content of less than 6% of a total fatty acid composition of the fatty acid product.

2. The method of claim 1, wherein the reaction conditions are time of hydrolysis and temperature of hydrolysis.

3. The method of claim 2, wherein the reaction condition of temperature is maintained at a temperature not exceeding 300° C. during said process.

4. The method of claim 2, wherein the temperature is maintained within the range of 220° C. to 250° C. during the hydrolysis.

5. The method of claim 2, wherein the temperature is about 230° C. during the hydrolysis.

6. The method of claim 2, wherein the glycerol fatty acid ester-containing composition is hydrolyzed for 1 to 6 hours.

7. The method of claim 2, wherein the glycerol fatty acid ester-containing composition is hydrolyzed for 2 to 4 hours.

8. The method of claim 2, wherein the glycerol fatty acid ester-containing composition is hydrolyzed for about 3 hours.

9. The method of claim 1, wherein the glycerol fatty acid ester-containing composition comprises a mixture of saturated and unsaturated fats or oils.

10. The method of claim 9, wherein the glycerol fatty acid ester-containing composition comprises a vegetable oil.

11. The method of claim 10, wherein the vegetable oil is selected from the group consisting of canola oil, castor oil, coconut oil, coriander oil, corn oil, cottonseed oil, hazelnut oil, olive oil, palm oil, peanut oil, rapeseed oil, rice bran oil, safflower oil, soybean oil and sunflower seed oil.

12. The method of claim 10, wherein the vegetable oil is soybean oil.

13. The method of claim 1, wherein the glycerol fatty acid ester-containing composition comprises a mixture of unsaturated fats.

14. The method of claim 13, wherein the glycerol fatty acid ester-containing composition comprises a vegetable oil.

15. The method of claim 14, wherein the vegetable oil is selected from the group consisting of canola oil, castor oil, coconut oil, coriander oil, corn oil, cottonseed oil, hazelnut oil, olive oil, palm oil, peanut oil, rapeseed oil, rice bran oil, safflower oil, soybean oil and sunflower seed oil.

16. The method of claim 14, wherein the vegetable oil is soybean oil.

17. The method of claim 1, wherein the fatty acid product has a trans-isomer fatty acid content of less than 5%.

18. The method of claim 1, wherein the fatty acid product has a trans-isomer fatty acid content of less than 4%.

19. The method of claim 1, wherein the fatty acid product has a trans-isomer fatty acid content of less than 3%.

20. The method of claim 1, wherein the fatty acid product has a trans-isomer fatty acid content of less than 2%.

21. The method of claim 1, wherein the fatty acid product has a trans-isomer fatty acid content of less than 1.5%.

22. The method of claim 1, which results in a high split yield.

23. The method of claim 22, wherein the high split yield is greater than 80%.

24. The method of claim 22, wherein the high split yield is greater than 90%.

25. The method of claim 22, wherein the high split yield is greater than 91%.

26. The method of claim 22, wherein the high split yield is greater than 92%.

27. The method of claim 22, wherein the high split yield is greater than 93%.

28. The method of claim 22, wherein the high split yield is greater than 94%.

29. The method of claim 22, wherein the high split yield is greater than 95%.

30. The method of claim 1, wherein the fatty acid product has a less than 3% increase in trans-isomer fatty acid content as compared to the glycerol fatty acid ester-containing composition.

31. The method of claim 30, wherein the fatty acid product has a less than 2.5% increase in trans-isomer fatty acid content as compared to the glycerol fatty acid ester-containing composition.

32. The method of claim 30, wherein the fatty acid product has a less than 2% increase in trans-isomer fatty acid content as compared to the glycerol fatty acid ester-containing composition.

33. The method of claim 30, wherein the fatty acid product has a less than 1.5% increase in trans-isomer fatty acid content as compared to the glycerol fatty acid ester-containing composition.

34. The method of claim 30, wherein the fatty acid product has a less than 1% increase in trans-isomer fatty acid content as compared to the glycerol fatty acid ester-containing.

35. The method of claim 1, wherein the reaction conditions are controlled to reduce thermal degradation of the fat and oil glycerol fatty acid ester-containing composition.

36. The method of claim 1, wherein the hydrolysis is carried out in a batch reactor.

37. The method of claim 1, wherein the hydrolysis reaction is carried out in a semi-continuous reactor.

38. The method of claim 1, wherein the hydrolysis reaction is carried out in a continuous reactor.

39. The method of claim 1, wherein agitation is used to increase the efficiency of the hydrolysis reaction.

40. The method of claim 39, wherein the agitation is by mechanical means.

41. The method of claim 39, wherein the agitation is by countercurrent flow.

42. The method of claim 1, further comprising separating the fatty acid product into an oil phase and an aqueous phase.

43. The method of claim 42, wherein the oil phase comprises a fatty acid with low trans-isomer fatty acid content.

44. The method of claim 42, wherein the separation is by distillation.

45. The method of claim 44 in which the distillation is performed under a vacuum.

46. The method of claim 42, wherein the separation is by centrifugation.

47. The method of claim 42, wherein the separation is by settling.

48. The method of claim 42, further comprising distilling the oil phase to yield a distillate comprising free fatty acids and a residue phase comprising free fatty acids, mono-acylglycerides, di-acylglycerides, and tri-acylglycerides.

49. The method of claim 48, wherein processing is conducted in a batch reactor.

50. The method of claim 48, wherein processing is conducted in a continuous reactor.

51. The method of claim 48, wherein processing is conducted in a semi-continuous reactor.

52. The method of claim 48, further comprising hydrolyzing the residue phase under reaction conditions resulting in fatty acids having a low proportion of trans-isomer fatty acids.

53. The method of claim 52, wherein, prior to hydrolyzing the residue phase, the residue phase is mixed with additional glycerol fatty acid ester-containing composition.

54. The method of claim 52, wherein the hydrolysis is conducted in a batch reactor.

55. The method of claim 52, wherein the hydrolysis is conducted in a continuous reactor.

56. The method of claim 52, wherein the hydrolysis is conducted in a semi-continuous reactor.

57. The method of claim 1, further comprising winterizing the hydrolyzed fatty acid product to produce an unsaturated fatty acid product having low trans-isomer content.

58. The method of claim 57, wherein the winterizing comprises:

(a) mixing the fatty acid product with a polyglycerol ester crystal modifier;

(b) cooling the mixture until saturated free fatty acids form solid particles; and (c) removing the solid particles from the mixture.

59. The method of claim 57, wherein the winterizing is conducted in a batch reactor.

60. The method of claim 57, wherein the winterizing is conducted in a continuous reactor.

61. The method of claim 57, wherein the winterizing is conducted in a semi-continuous reactor.

62. The method of claim 1, further comprising esterifying one of glycerol and a mono-acylglyceride with the fatty acid product to produce a 1,3-diacylglyceride.

63. The method of claim 62, wherein the esterification is enzymatic.

64. The method of claim 62, wherein a lipase is used in the enzymatic esterification.

65. The method of claim 62, wherein the esterification is conducted in a batch reactor.

66. The method of claim 62, wherein the esterification is conducted in a continuous reactor.

67. The method of claim 62, wherein the esterification is conducted in a semi-continuous reactor.

68. A free fatty acid composition having low trans-isomer fatty acid content produced by the method of claim 1.

69. The free fatty acid composition of claim 68, wherein the low trans-isomer fatty acid composition is used in the production of a food product.

70. A free fatty acid composition having a low trans-isomer fatty acid content produced by the method of claim 48.

71. The free fatty acid composition of claim 70, wherein the low trans-isomer fatty acid composition is used in the production of a food product.

72. A free fatty acid composition having a low trans-isomer fatty acid content produced by the method of claim 56.

73. The free fatty acid composition of claim 72, wherein the low trans-isomer fatty acid composition is used in the production of a food product.

74. A 1,3-diacylglyceride composition produced by the method of claim 62.

75. The 1,3-diacylglyceride composition of claim 74, wherein the 1,3-diacylglyceride composition is used in the production of a food product.

76. A food product comprising low trans-isomer free fatty acids produced by the method of claim 1.

77. The method of claim 24, wherein the fatty acid product has a less than 3% increase in trans-isomer fatty acid content as compared to the glycerol fatty acid ester-containing composition.

78. The method of claim 24, wherein the fatty acid product has a less than 1% increase in trans-isomer fatty acid content as compared to the glycerol fatty acid ester-containing composition.

79. The method of claim 29, wherein the fatty acid product has a less than 3% increase in trans-isomer fatty acid content as compared to the glycerol fatty acid ester-containing composition.

80. The method of claim 29, wherein the fatty acid product has a less than 1% increase in trans-isomer fatty acid content as compared to the glycerol fatty acid ester-containing composition.

* * * * *